United States Patent
Feng

(10) Patent No.: US 9,010,408 B1
(45) Date of Patent: Apr. 21, 2015

(54) GRAZING-ANGLE THERMAL EMISSION (GATE) AND THERMAL ANTENNA ARRAY (TAA) FOR MULTI-CHANNEL THERMAL COMMUNICATIONS

(75) Inventor: Simin Feng, Ridgecrest, CA (US)

(73) Assignee: The Government of the United States of America as Represented by the Secretary of the Navy, Washington, DC (US)

( * ) Notice: Subject to any disclaimer, the term of this patent is extended or adjusted under 35 U.S.C. 154(b) by 952 days.

(21) Appl. No.: 13/171,617

(22) Filed: Jun. 29, 2011

Related U.S. Application Data

(60) Provisional application No. 61/377,574, filed on Aug. 27, 2010.

(51) Int. Cl.
*F28F 13/18* (2006.01)
*G02B 5/18* (2006.01)
*F28F 7/00* (2006.01)

(52) U.S. Cl.
CPC .................... *G02B 5/1809* (2013.01)

(58) Field of Classification Search
CPC ... H01Q 15/147; H01Q 15/148; H01Q 15/00; H01Q 1/40; G02B 5/1809; H04N 5/33
USPC .................... 165/135, 185; 343/909; 359/359
See application file for complete search history.

(56) References Cited

U.S. PATENT DOCUMENTS

| | | | | |
|---|---|---|---|---|
| 5,455,594 | A * | 10/1995 | Blasing et al. | 343/700 MS |
| 6,899,170 | B2 * | 5/2005 | Biter et al. | 165/277 |
| 8,071,931 | B2 * | 12/2011 | Novack et al. | 250/208.2 |
| 8,149,180 | B2 * | 4/2012 | Thevenot et al. | 343/909 |
| 8,259,032 | B1 * | 9/2012 | Buckley | 343/909 |
| 2004/0008145 | A1 * | 1/2004 | Killen et al. | 343/753 |
| 2004/0263420 | A1 * | 12/2004 | Werner et al. | 343/909 |
| 2009/0009856 | A1 * | 1/2009 | Hasman et al. | 359/352 |
| 2009/0205090 | A1 * | 8/2009 | Mimouni et al. | 850/30 |

FOREIGN PATENT DOCUMENTS

GB      2337860 A * 12/1999

* cited by examiner

*Primary Examiner* — Tho V Duong
(74) *Attorney, Agent, or Firm* — Charlene A. Haley

(57) ABSTRACT

Altering the direction of thermal radiation of any objects into any construction directions including grazing angles. Embodiments of the invention provide a new technique for thermal control and management.

17 Claims, 5 Drawing Sheets

GRAZING-ANGLE THERMAL EMISSION (GATE) AND THERMAL ANTENNA ARRAY (TAA) FOR MULTI-CHANNEL THERMAL COMMUNICATIONS

CROSS-REFERENCE TO RELATED APPLICATIONS

This is a non-provisional patent application claiming benefit of parent provisional application filed in accordance with 35 U.S.C. 111(b), Ser. No. 61/377,574 filed on Aug. 27, 2010, whereby the entire disclosures of which is incorporated hereby reference.

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

FIELD OF THE INVENTION

The invention generally relates to altering the direction of thermal radiation of any objects into any construction directions including grazing angles. Embodiments of the invention provide a new technique for thermal control and management.

Figure 1A:
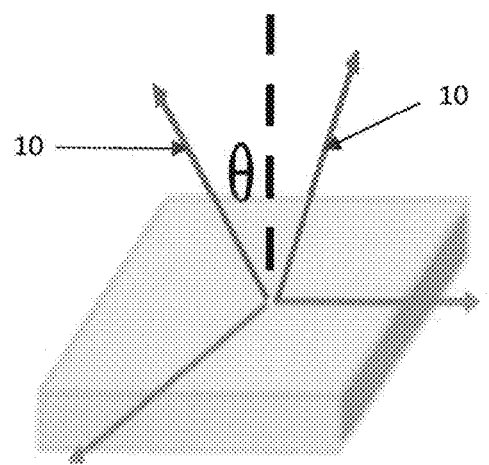
FIGS. 1A&B are illustrations of A showing the definition of emission angle ($\theta$) and B showing a typical GATE construct, ultra-thin subwavelength 1D gratings patterned on the surface of thin metal films, according to embodiments of the invention.
Figure 1B:
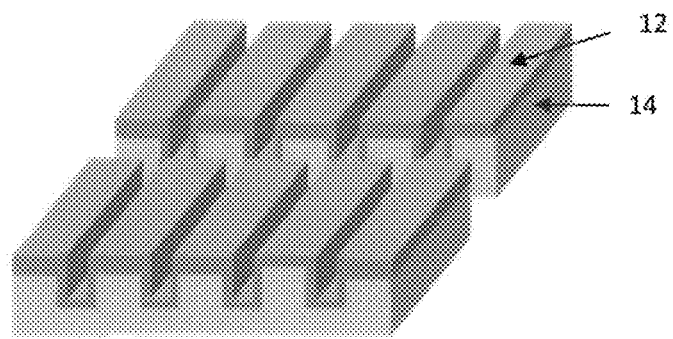

It is to be understood that the foregoing general description and the following detailed description are exemplary and explanatory only and are not to be viewed as being restrictive of the invention, as claimed. Further advantages of this invention will be apparent after a review of the following detailed description of the disclosed embodiments, which are illustrated schematically in the accompanying drawings and in the appended claims.

DETAILED DESCRIPTION OF EMBODIMENTS OF THE INVENTION

The invention generally relates to altering the direction of thermal radiation of any objects into any construction directions including grazing angles. Embodiments of the invention relate to metamaterial coatings including, at least one metallic subwavelength feature to redirect thermal radiation and to reduce the radiation cone or angular spread, and at least one bandpass frequency filter to reduce the bandwidth of the thermal radiation, where the subwavelength feature and the filter are associated with each other to produce a desired narrow cone and narrow bandwidth thermal emission into the grazing angle creating at least one hot spot, where each hot spot acts as a highly directional thermal antenna radiating at different frequencies and different angles to achieve narrow-beam multidirectional and multi-frequency emissions.

Another aspect of the invention includes methods for using metamaterial coatings on hot objects including, coating at least one hot object having at least one metallic subwavelength feature to redirect thermal radiation and to reduce the radiation cone or angular spread, and providing at least one bandpass frequency filter to reduce the bandwidth of the thermal radiation, where the subwavelength feature and the filter are associated with each other to produce a desired narrow cone and narrow bandwidth thermal emission into the grazing angle creating at least one hot spot, where each hot spot acts as a highly directional thermal antenna radiating at different frequencies and different angles to achieve narrow-beam multidirectional and multi-frequency emissions.

In embodiments, the features include at least one ultra-thin subwavelength metallic feature having patterned structures directing thermal radiation into grazing angles. In other embodiments, the subwavelength metallic features are selected from the group consisting of grating periods, depths, and filling ratios. In other embodiments, the subwavelength metallic features are separate from other features including features selected from the group consisting of grating periods, depths, and filling ratios. Yet in other embodiments, the subwavelength metallic feature is in a layer form. In embodiment, the subwavelength structures/features are located on the surface of any metal or metallic-like surface. Yet in other embodiments, the subwavelength metallic gratings are single or multilayer.

In embodiments, the metamaterial coating(s) is associated with a metallic surface and coating(s) having a grazing-angle thermal emission (GATE) construct that adjust to desired thermal emissivity, directivity, and frequency. In embodiments, the coatings are in the form of thin films. In yet other embodiments, the coating makes the associated surface less detectable. In other embodiments, the coatings configure thermal radiation into data transports to establish long-range far-field thermal communication network. Still yet in other embodiments, the coatings configure thermal radiation into data transports to establish short-range near-field thermal communication network. In embodiments, the coatings, thermal antenna arrays, filters, and modulation formats (TAA) serve as multi-channel carriers to construct thermal wavelength-division-multiplexing devices and/or subsystems.

In embodiments, the gratings include dielectric spacers. In embodiments, the filter is associated with the subwavelength metallic features in a construct where the filter is associated with the bottom of the subwavelength metallic feature. In other embodiments, the filter is associated with the subwavelength metallic features in a construct where the filter is associated with the top of the subwavelength metallic feature. In embodiments, the radiation pattern and hot spots are manipulated by proper management and modulation format(s) into being a thermal communication network through either passive or active absorption or gain controls combined with proper filter constructs.

Grazing-angle thermal emission (GATE) and thermal antenna array (TAA) are specially constructed ultra-thin metamaterial (MM) coatings for thermal emissivity controls.

The constructed thin-film MM coatings will perform two basic functions: releasing the trapped heat and reusing it.

1. Grazing-angle thermal emission (GATE): Using GATE to release the trapped heat parallel to the radiation surface, i.e. direct the thermal emission into grazing angles. The benefit of GATE is obvious. Since most objects radiate in the forward direction (normal to the radiation surface), the proposed GATE thin-film coatings make the objects less detectable.

2. Thermal antenna array (TAA) for multi-channel thermal communications: TAA is a metamaterial thin-film coating that modifies the radiation pattern of the hot surfaces to achieve narrow-beam multidirectional and multi-frequency emissions. The benefit of the TAA is broadband, lightweight, and no heavy antenna-arms poking out. The proposed TAA coatings can transform a hot surface into a platform for multi-channel thermal communications.

These embodiments are envisioned to be used for reusing waste energy for future thermal communications including long-range data transports and near-field thermal communications networks. Along with properly constructed filters and modulation formats, the proposed thermal antenna arrays can serve as multi-channel carriers for future thermal WDM (wavelength-division-multiplexing) devices and subsystems.

Figures 2A, 2B:
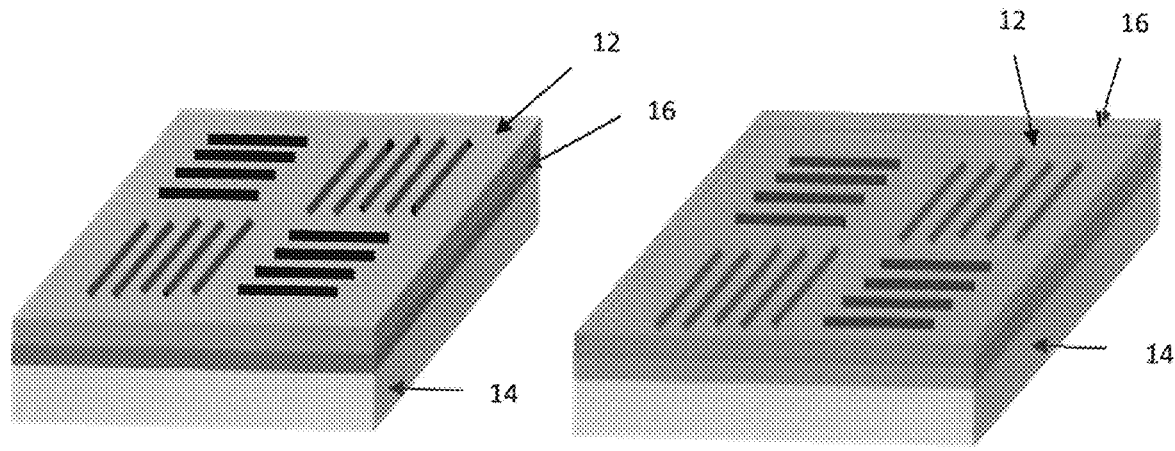
FIGS. 2A&B are illustrations showing the typical constructs for GATE and TAA, according to embodiments of the invention.

Subwavelength features on the surface of metal can significantly modify the behavior of the thermal radiation. Radiation angles and frequencies can be selected by properly constructed subwavelength patterns. The MM thin films can be either single layer or multi-layers patterned structures. As examples, a single-layer grating patterns was used and shown in the figures. FIGS. 1A & B and FIGS. 2A & 2B show the typical constructs for GATE and TAA. The figures only show single-layer grating patterns. The same idea and principle can be applied to other pattern constructs and also applied to multi-layer pattern constructs.

FIGS. 1A & B. Left: Showing the definition of emission angle ($\theta$). Grazing angle 10 refers to the range close to 90°, i.e. parallel to the radiation surface. Right: Schematic showing a typical GATE construct, ultra-thin subwavelength 1D gratings patterned on the surface of thin metal films 12, 14 is the substrate. Depending on practical applications, a filter layer can be added on either top or bottom of the grating, as shown in FIGS. 2A&B (16).

FIGS. 2A&B. Schematic showing the typical TAA constructs: ultra-thin subwavelength 2D gratings patterned on the surface of the metal thin-films (12), representing the concept of integrated multidirectional and multi-frequency thermal antenna arrays. The bars represent the subwavelength gratings. The filter layer 16 can be added either on the bottom (left) or on the top (right) of the grating layer depending on applications.

Figure 3:
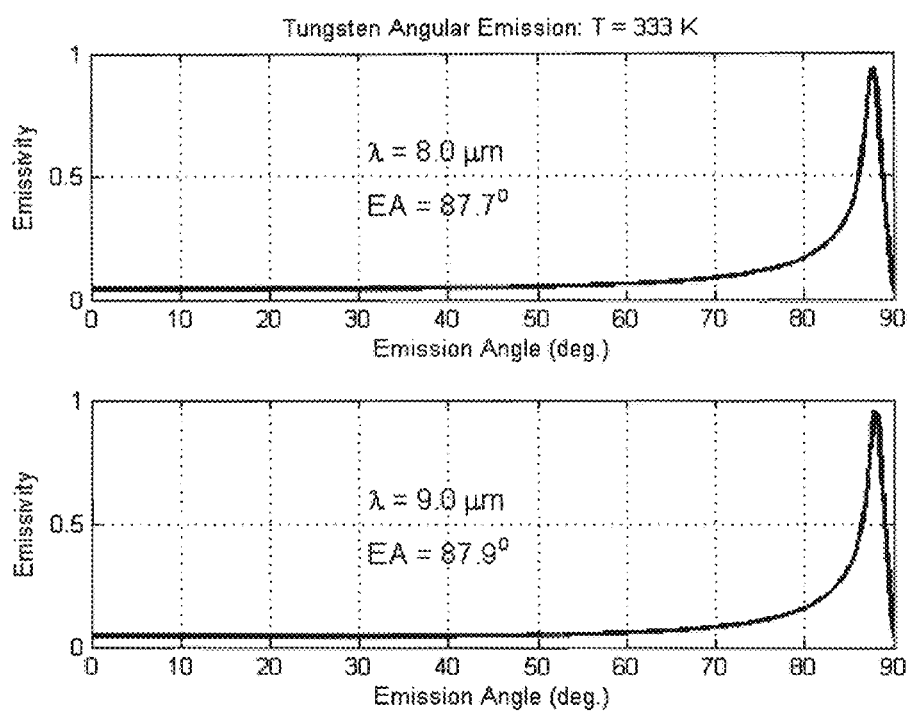
FIG. 3 is two graphs showing the angular distribution of thermal emission from a tungsten GATE at the temperature 333K (60°) for different wavelengths at 8 micrometer and 9 micrometer, according to embodiments of the invention.

GATE:

The ideas and construct principles can be applied to any metals at any temperatures. Here we use tungsten at the temperature 333K as an example. FIG. 3 shows the angular distribution of thermal emission from a tungsten GATE. As opposite to the blackbody radiation which is isotropic, i.e. the emissivity of blackbody is angular independent. Clearly, the subwavelength structures on the tungsten surface significantly modify the thermal emissivity of the hot surface. Except for the overall reduction of emission due to the nature of tungsten, the GATE construct enhances the thermal radiation in the direction parallel to the surface.

FIG. 3. Angular distribution of the thermal emissions, where emission from a tungsten GATE showing at two wavelengths. Almost unit emission near the grazing angle 90° and little emission at other angles.

TAA:

A schematic view of thermal antenna arrays is shown in FIGS. 2A&B. Since the thermal excitation is localized, by adjusting the grating period, depth, and filling ratio, the thermal emissivity, directivity, and frequency can be selected at will.

Figure 4:
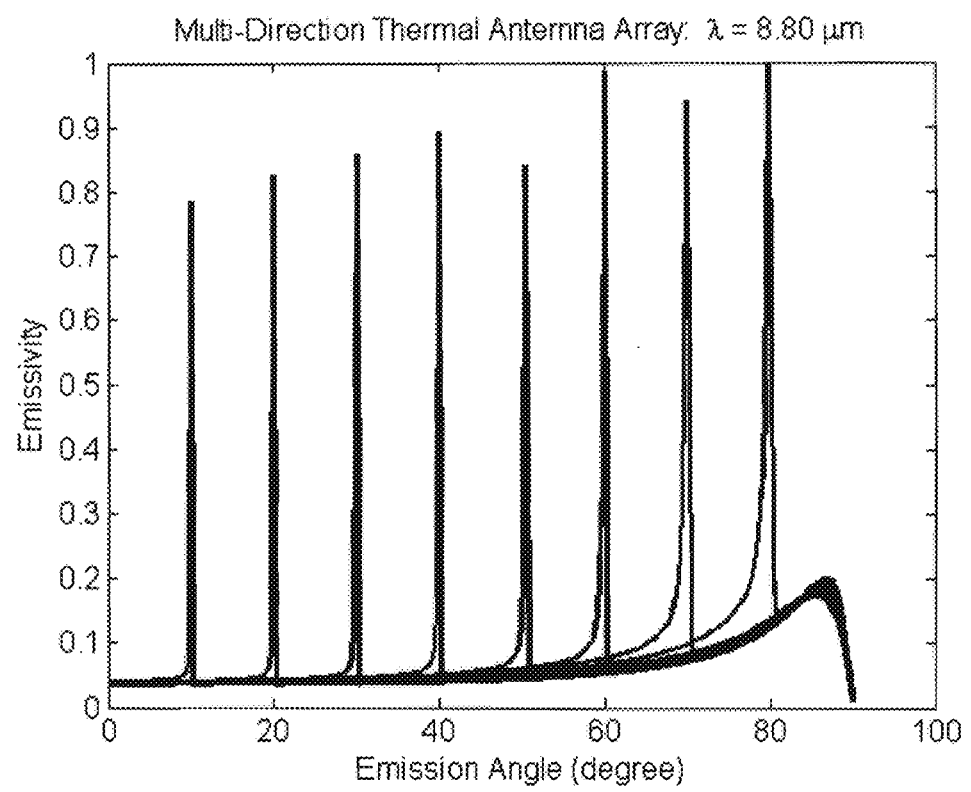
FIG. 4 is a graph showing the narrow-beam multi-directional emission from a thermal antenna array patterned on the tungsten surface, according to embodiments of the invention.

FIG. 4 shows the narrow-beam multi-directional emission from a thermal antenna array patterned at the tungsten surface. The gratings are constructed to enhance the radiation at the wavelength 8.8 µm that is the maximum emissivity at the temperature 60°. Clearly, the method applies to any temperatures.

Figure 5:
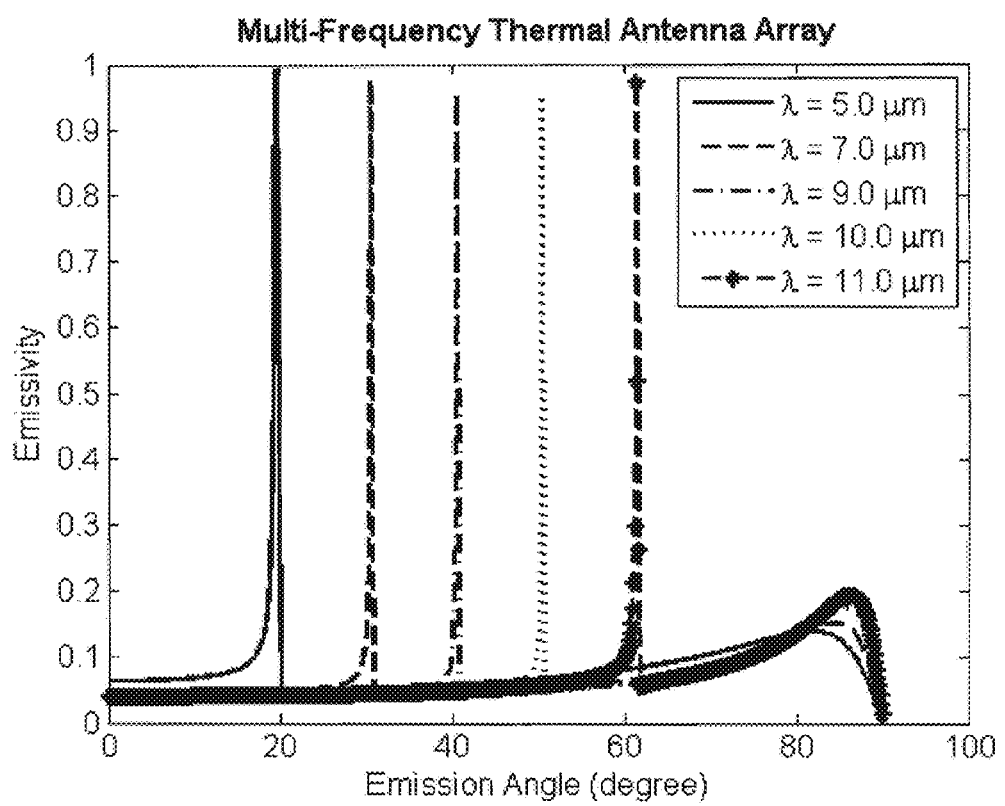
FIG. 5 is a graph showing multi-frequency, narrow-beam, and multi-directional emissions from a filtered thermal antenna array, according to embodiments of the invention.

FIG. 4. Single frequency, narrow-beam, and multi-directional emissions from a filtered thermal antenna array. To fully benefit from the broadband nature of the thermal radiation, FIG. 5 shows the emission from a multi-frequency construct. The thermal antenna array patterned at the tungsten surface radiates narrow-beams of multi-colors at different angles.

FIG. 5. Multi-frequency, narrow-beam, and multi-directional emissions from a filtered thermal antenna array. FIGS. 4 and 5 demonstrate the flexibility of our constructs for thermal emissivity controls. The highly directional emissions shown in FIGS. 4 and 5 pave the way for potential multi-channel thermal communications. Each hot spot acts as a highly directional thermal antenna radiating at different frequencies at different angles. Such localized emission spots conceives the idea of thermal communication network. The ideas and simulations in this invention demonstrate the possibility of manipulating radiation behaviors of hot surfaces to serve the endeavor of multi-channel thermal WDM communications.

Hot spots represent high emissivity, acting as thermal antennas. With the proper management and modulation format, those hot spots can be designed into a thermal communication network.

Thermal radiation is incoherent and quasi-isotropic, i.e. quasi-uniform in all directions, which render the objects being easily detected. Currently, there is no effective way to control thermal/heat radiation. The invention describes special metamaterial coatings that can reduce thermal radiation in the forward direction and alter the radiation into any construct direction, including grazing angles. So most of the thermal electromagnetic energy released by the objects can propagate along the surfaces of the objects.

The special metamaterial coating can function as a smart skin to cover the surface of any objects. The metamaterial smart skins have an integrated thermal control capability: (a) Thermal radiation controls and managements, (b) Thermal communications.

To perform above tasks, this invention includes three functions and one concept. Three functions: (1) Direct thermal emission into grazing angles, i.e. parallel along the surface of the objects, (2) Thermal antenna array for narrow-beam and multi-directional emissions, (3) Multi-frequency thermal antenna arrays. Concept of thermal communications: (a) Construct Thermal WDM (wavelength-division-multiplexing) devices and subsystems, (b) Thermal antenna arrays+Filters+Modulations, (c) Long-range far-field thermal communications, (d) Short-range near-field thermal communication network, Typically objects radiate heat in all directions due to the intrinsic properties of thermal sources. Metamaterial thermal-control coatings can modify the direction of heat radiation, such that reducing thermal radiation in unwanted directions and altering the radiation into any constructed direction including grazing angles, i.e. parallel to the surfaces of the objects. Currently there is no effective way to control the direction of thermal radiation.

The metamaterial coatings use special constructed single or multilayer subwavelength metallic gratings with dielectric spacers. The invented metamaterial coatings utilize thermally induced surface resonance to modify statistical properties and coherent nature of the thermal radiation. The specially constructed subwavelength metallic gratings can conduct the heat radiation along the surface of the objects.

Potential applications include signature controls, thermal sources, thermophotovoltaics, thermal sensors, infrared and optical sensors, and thermal antennas. Further slides and documents are attached to the provisional application and are incorporated as such.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

What is claimed is:

1. A metamaterial coating for using on a hot object, comprising:
    at least one metallic subwavelength feature to redirect thermal radiation patterns from the hot object and to reduce a radiation cone or angular spread; and
    at least one bandpass frequency filter to reduce a bandwidth of said thermal radiation, wherein said at least one metallic subwavelength feature and said at least one filter are associated with each other to produce a desired narrow cone and narrow bandwidth thermal emission into a grazing angle creating at least one hot spot, wherein each said hot spot acts as a highly directional thermal antenna (or arrays) radiating at different frequencies and different angles to achieve narrow-beam multidirectional and multi-frequency emissions.

2. The coating according to claim 1, wherein said subwavelength features comprises at least one ultra-thin subwavelength metallic feature having patterned structures directing thermal radiation into grazing angles.

3. The coating according to claim 1, wherein said metamaterial coating(s) is associated with a metallic surface and said coating having a grazing-angle thermal emission (GATE) construct that adjust to desired thermal emissivity, directivity, and frequency.

4. The coating according to claim 1, wherein said metamaterial coatings are in the form of thin films.

5. The coating according to claim 1, wherein said coating makes said associated surface less detectable.

6. The coating according to claim 1, wherein said at least one subwavelength metallic feature are selected from the group consisting of grating periods, depths, and filling ratios.

7. The coating according to claim 1, wherein said filter is associated with said subwavelength metallic features in a construct wherein said filter is associated with the bottom of said subwavelength metallic feature.

8. The coating according to claim 6, wherein said subwavelength metallic feature comprises a layer form.

9. The coating according to claim 1, wherein said filter is associated with said at least one subwavelength metallic feature in a construct wherein said filter is associated with the top of said subwavelength metallic feature.

10. The coating according to claim 6, wherein said subwavelength metallic feature comprises a layer form.

11. The coating according to claim 1, wherein said at least one subwavelength feature are located on the surface of any metal surface.

12. The coating according to claim 1, wherein said radiation pattern and said hot spots are manipulated by proper management and modulation format(s) into being a thermal communication network through either passive or active absorption or gain controls combined with proper filter constructs.

13. The coating according to claim 1, wherein said metamaterial coatings configure thermal radiation into data transports to establish long-range far-field thermal communication network.

14. The coating according to claim 1, wherein said metamaterial coatings configure thermal radiation into data transports to establish short-range near-field thermal communication network.

15. The coating according to claim 12, wherein said metamaterial coatings, thermal antenna arrays, filters, and modulation formats (TAA) serve as multi-channel carriers to construct thermal wavelength-division-multiplexing devices and/or subsystems.

16. The coating according to claim 6, wherein said subwavelength metallic gratings are single or multilayer.

17. A method for using metamaterial coatings on hot objects, comprising:
    coating at least one hot object having at least one metallic subwavelength feature to redirect thermal radiation from said hot object and to reduce the radiation cone or angular spread; and
    providing at least one bandpass frequency filter to reduce the bandwidth of said thermal radiation, wherein said at least one metallic subwavelength feature and said filter are associated with each other to produce a desired narrow cone and narrow bandwidth thermal emission into the grazing angle creating at least one hot spot, wherein each said hot spot acts as a highly directional thermal antenna radiating at different frequencies and different angles to achieve narrow-beam multidirectional and multi-frequency emissions.

* * * * *